(12) United States Patent
Hori et al.

(10) Patent No.: US 11,537,170 B2
(45) Date of Patent: Dec. 27, 2022

(54) ELECTRONIC DEVICE

(71) Applicant: Dynabook Inc., Tokyo (JP)

(72) Inventors: Takehiro Hori, Tokyo (JP); Toshiyuki Hirota, Tokyo (JP); Shigeki Nishiyama, Tokyo (JP); Kazuhiro Nakamura, Tokyo (JP); Tomokazu Yuasa, Tokyo (JP); Shingo Koide, Tokyo (JP)

(73) Assignee: DYNABOOK INC., Tokyo (JP)

( * ) Notice: Subject to any disclaimer, the term of this patent is extended or adjusted under 35 U.S.C. 154(b) by 0 days.

(21) Appl. No.: 17/539,651

(22) Filed: Dec. 1, 2021

(65) Prior Publication Data

US 2022/0308636 A1 Sep. 29, 2022

(30) Foreign Application Priority Data

Mar. 26, 2021 (JP) .............................. JP2021-054407

(51) Int. Cl.
*G06F 1/16* (2006.01)

(52) U.S. Cl.
CPC .......... *G06F 1/1658* (2013.01); *G06F 1/1688* (2013.01); *G06F 1/1698* (2013.01)

(58) Field of Classification Search
CPC .... G06F 1/1656; G06F 1/1658; G06F 1/1688; G06F 1/1698
See application file for complete search history.

(56) References Cited

U.S. PATENT DOCUMENTS

| 6,597,794 | B2 * | 7/2003 | Cole | G06F 1/1632 |
| | | | | 381/388 |
| 7,212,399 | B2 * | 5/2007 | Kee | G06F 1/1637 |
| | | | | 361/679.09 |
| 7,663,554 | B2 | 2/2010 | Kuroyanagi et al. | |
| 7,991,147 | B2 * | 8/2011 | Emmert | H04M 1/026 |
| | | | | 455/575.1 |
| 9,203,137 | B1 | 12/2015 | Guterman et al. | |
| RE45,925 | E * | 3/2016 | Tojo | G06F 1/00 |
| 9,397,387 | B1 | 7/2016 | Guterman et al. | |
| 9,653,777 | B2 | 5/2017 | Guterman et al. | |
| 9,854,078 | B2 * | 12/2017 | Lee | H04M 1/035 |
| 10,347,965 | B2 | 7/2019 | Hawaka et al. | |

(Continued)

FOREIGN PATENT DOCUMENTS

| CN | 1792093 A | 6/2006 |
| CN | 105938383 B | 8/2017 |

(Continued)

*Primary Examiner* — Adrian S Wilson
(74) *Attorney, Agent, or Firm* — Knobbe, Martens, Olson & Bear LLP

(57) ABSTRACT

According to one embodiment, an electronic device includes a housing including a shield region, and a non-shield region formed of a dielectric, a part of the shield region is formed of a conductor, an antenna in the non-shield region, a vibration generating member including a casing formed of a dielectric, the vibration generating member being in the housing such that a surface of a part of the casing in the shield region and another part of the casing in the non-shield region, and an elastic support member which is sandwiched between the housing and the part of the casing, the elastic support member having a conductive property.

8 Claims, 8 Drawing Sheets

(56) References Cited

U.S. PATENT DOCUMENTS

| | | | |
|---|---|---|---|
| 2003/0096632 A1* | 5/2003 | Kim | H04M 1/035 455/90.3 |
| 2007/0049326 A1* | 3/2007 | Kim | H01Q 1/243 455/550.1 |
| 2007/0097073 A1* | 5/2007 | Takashima | G06F 3/016 345/156 |
| 2007/0248236 A1* | 10/2007 | Miyata | H04R 5/04 381/152 |
| 2013/0329450 A1* | 12/2013 | Degner | G06F 1/1616 361/679.55 |
| 2014/0112511 A1 | 4/2014 | Corbin et al. | |
| 2014/0333486 A1* | 11/2014 | Greetis | H01Q 1/243 29/601 |
| 2017/0194691 A1 | 7/2017 | Qin et al. | |
| 2018/0375189 A1 | 12/2018 | Hawaka et al. | |
| 2020/0186900 A1 | 6/2020 | Ishihara et al. | |
| 2020/0194870 A1 | 6/2020 | Yamamoto et al. | |
| 2020/0274239 A1* | 8/2020 | Amano | H01Q 1/2266 |

FOREIGN PATENT DOCUMENTS

| | | |
|---|---|---|
| CN | 105938382 B | 5/2019 |
| DE | 10 2016 200 515 A1 | 9/2016 |
| EP | 1 622 375 B1 | 6/2011 |
| EP | 2 753 051 A1 | 7/2014 |
| JP | 2005-341547 A | 12/2005 |
| JP | 3203585 U | 4/2016 |
| JP | 6513136 B2 | 5/2019 |
| KR | 10-0717228 B1 | 5/2007 |
| KR | 10-1812870 B1 | 12/2017 |
| WO | WO 2012/106216 A2 | 8/2012 |

* cited by examiner

ELECTRONIC DEVICE

CROSS-REFERENCE TO RELATED APPLICATIONS

This application is based upon and claims the benefit of priority from Japanese Patent Application No. 2021-054407, filed Mar. 26, 2021, the entire contents of which are incorporated herein by reference.

FIELD

Embodiments described herein relate generally to an electronic device.

BACKGROUND

Several types of electronic devices such as notebook PC or mobile PC comprise telecommunication functions. As antennas for communication mounted on the electronic devices, for example, antennas for wireless LAN, antennas for Long Term Evolution (LTE), and antennas for the fifth generation mobile communication system (5G) are known. When the antenna is mounted on a housing together with a circuit board and the like, the performance of the antenna needs to be secured in consideration of the influence of the noise produced by electronic components such as CPU.

DETAILED DESCRIPTION

Figure 1:
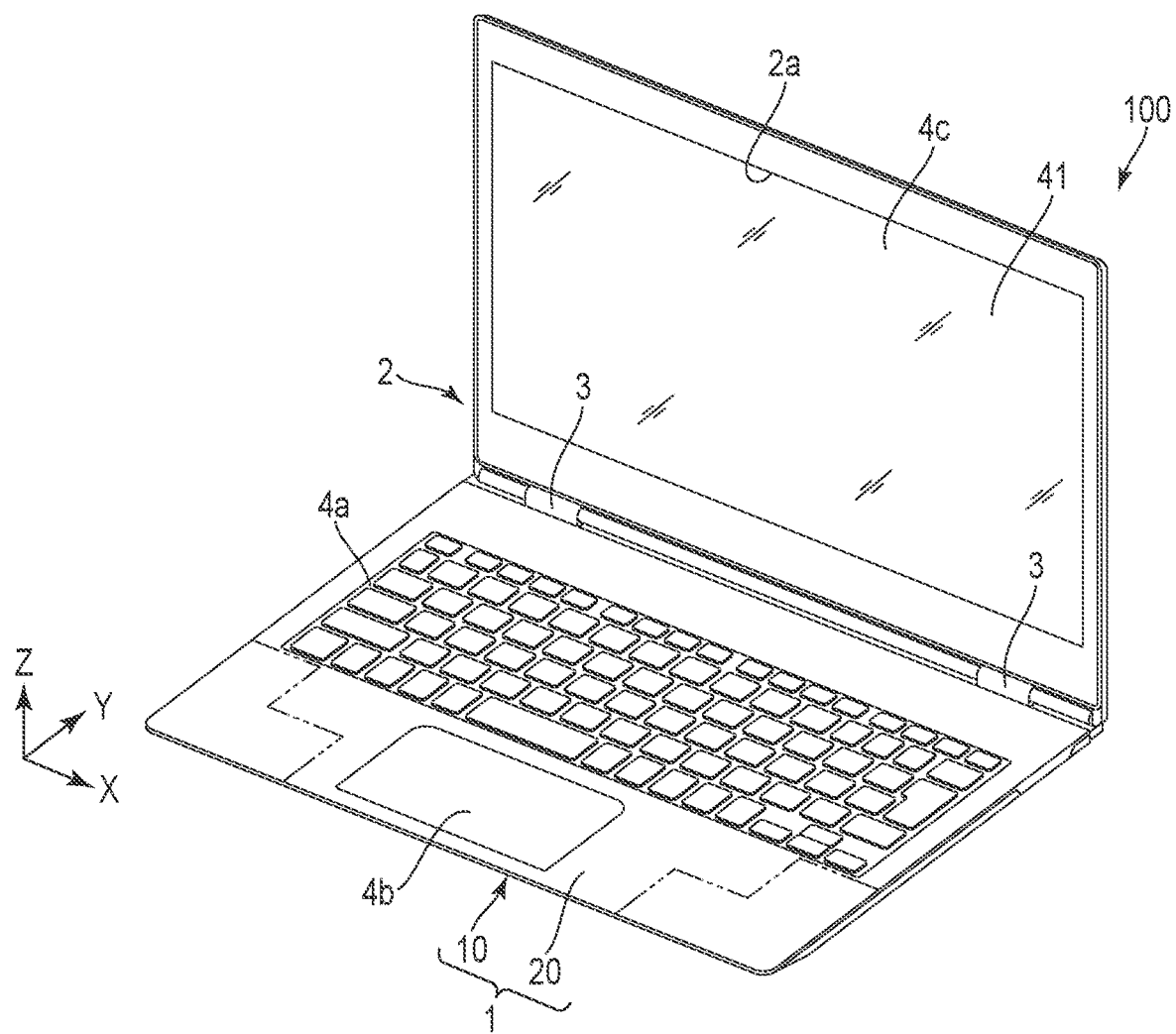
FIG. 1 is a perspective view schematically showing an electronic device according to an embodiment.

In general, according to one embodiment, an electronic device comprises a housing including a shield region, and a non-shield region formed of a dielectric and not shielded, at least a part of the shield region is formed of a conductor, and the non-shield region located on an outer peripheral side than the at least part of the shield region, a circuit board which is arranged in the shield region in the housing and on which electronic components are mounted, an antenna which is arranged in the non-shield region in the housing, a vibration generating member including a casing formed of a dielectric and a vibrating body provided in the casing, the vibration generating member is arranged in the housing such that a surface of a part of the casing is located in the shield region and another part of the casing is located in the non-shield region, and an elastic support member which is sandwiched between the housing and the part of the casing in the shield region and elastically supports the casing, the elastic support member having a conductive property.

A conductive layer is formed on a surface of the vibration generating member, the surface is located in the shield region, the conductive layer contacts the elastic support member, and the conductive layer is electrically connected to the conductor by the elastic support member.

An electronic device according to one of embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In the embodiment, a first direction X, a second direction Y, and a third direction Z are defined. The first direction X, the second direction Y, and the third direction Z are orthogonal to each other, but may intersect at an angle other than 90 degrees. Viewing an X-Y plane defined by the first direction X and the second direction Y is referred to as planar view.

FIG. 1 is a perspective view schematically showing an electronic device 100 according to the embodiment. In the embodiment, a notebook PC is disclosed as an example of the electronic device 100. The electronic device 100 comprises a housing 1, a housing 2, and a hinge 3 connecting the housing 1 with the housing 2. The housings 1 and 2 have a flat and approximately rectangular parallelepiped shapes. The housings 1 and 2 are connected to be rotatable (openable and closable) about a shaft of the hinge 3 provided in the longitudinal direction. The shaft of the hinge 3 is a shaft parallel to the first direction X. The housing 2 can be pivoted at 180 degrees, for example, in a state of being closed to the housing 1. FIG. 1 shows a state in which the housing 2 is pivoted at approximately 90 degrees to the housing 1. Furthermore, the housing 2 can also be pivoted at 360 degrees in a state of being closed to the housing 1 by adopting a double axis structure to the hinge 3.

The housing 1 is provided with a keyboard 4a and a touch pad 4b for input. Furthermore, a circuit board 5 to be described later and the like are accommodated in the housing 1. The housing 1 includes a lower housing 10 and an upper housing 20 overlaid on the lower housing 10 in the third direction Z. When the housing 2 is closed to the housing 1, the upper housing 20 is opposed to the housing 2. When the electronic device 100 is placed on an installation surface of the desk or the like, the lower housing 10 is opposed to the installation surface. The lower housing 10 and the upper housing 20 are fixed in a state of being overlaid by coupling using nails, screwing, bonding or the like.

The housing 2 is provided with a display 4c. The display 4c includes a display part 41 at a position corresponding to an opening 2a formed in the housing 2. The display 4c is, for example, a liquid crystal display or an organic electroluminescent display. The display part 41 may display an image, text information, and the like and may further enable operations of a touch panel or the like to be executed for input.

In a state in which the housing 2 is opened to the housing 1 as shown in FIG. 1, a front side and a back side of the housing 1 in the second direction Y are defined as "front" and "back", respectively, and one side and the other side in the first direction X are defined as "left" and "right", respectively, in terms of the direction in which the user visually recognizes the display part 41 from the front surface. The third direction Z is defined as "on" or "above" and a direction opposite to the third direction Z is defined as "under" or "below".

Figure 2:
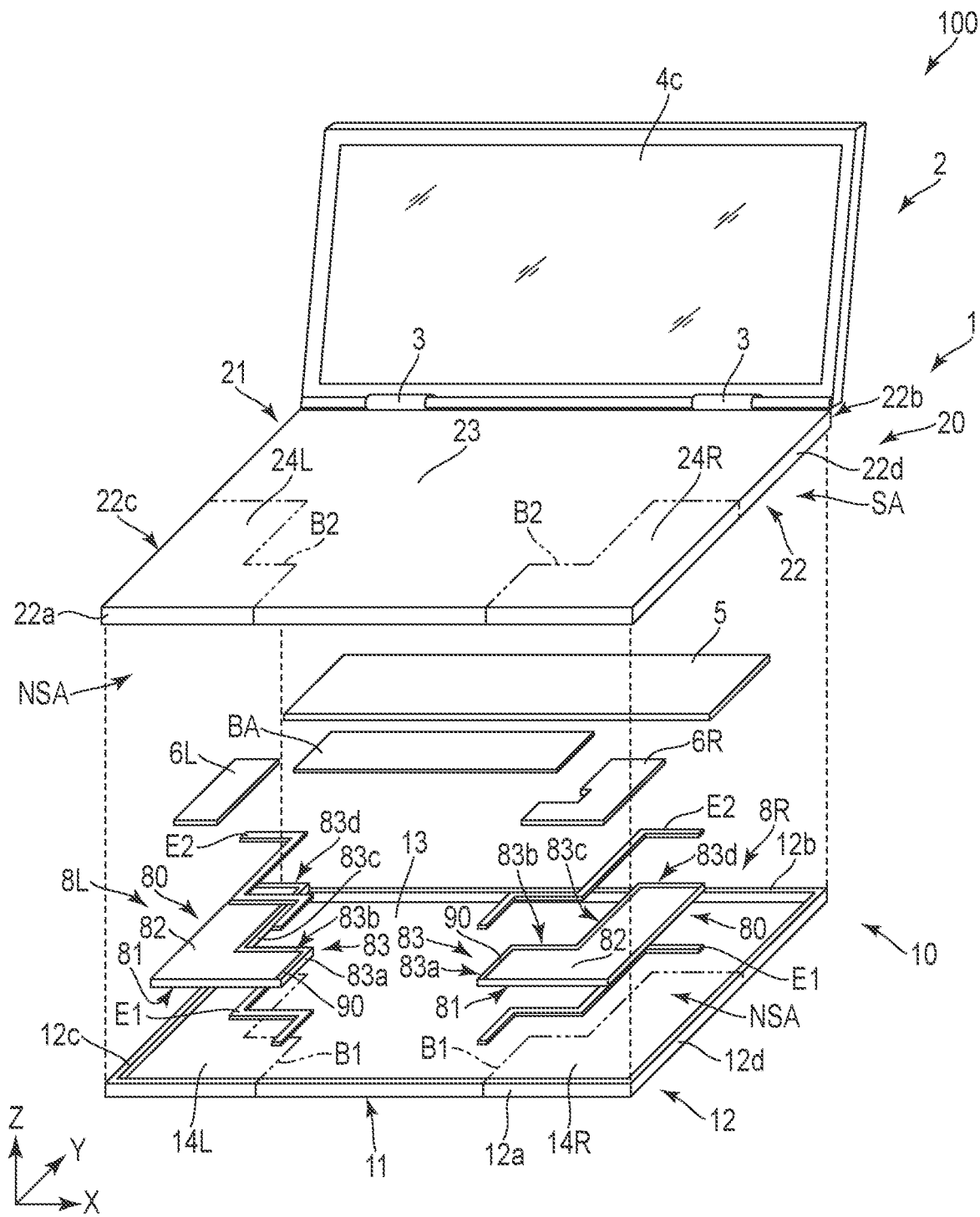
FIG. 2 is an exploded perspective view schematically showing a housing provided on the electronic device according to the embodiment.
Figure 3:
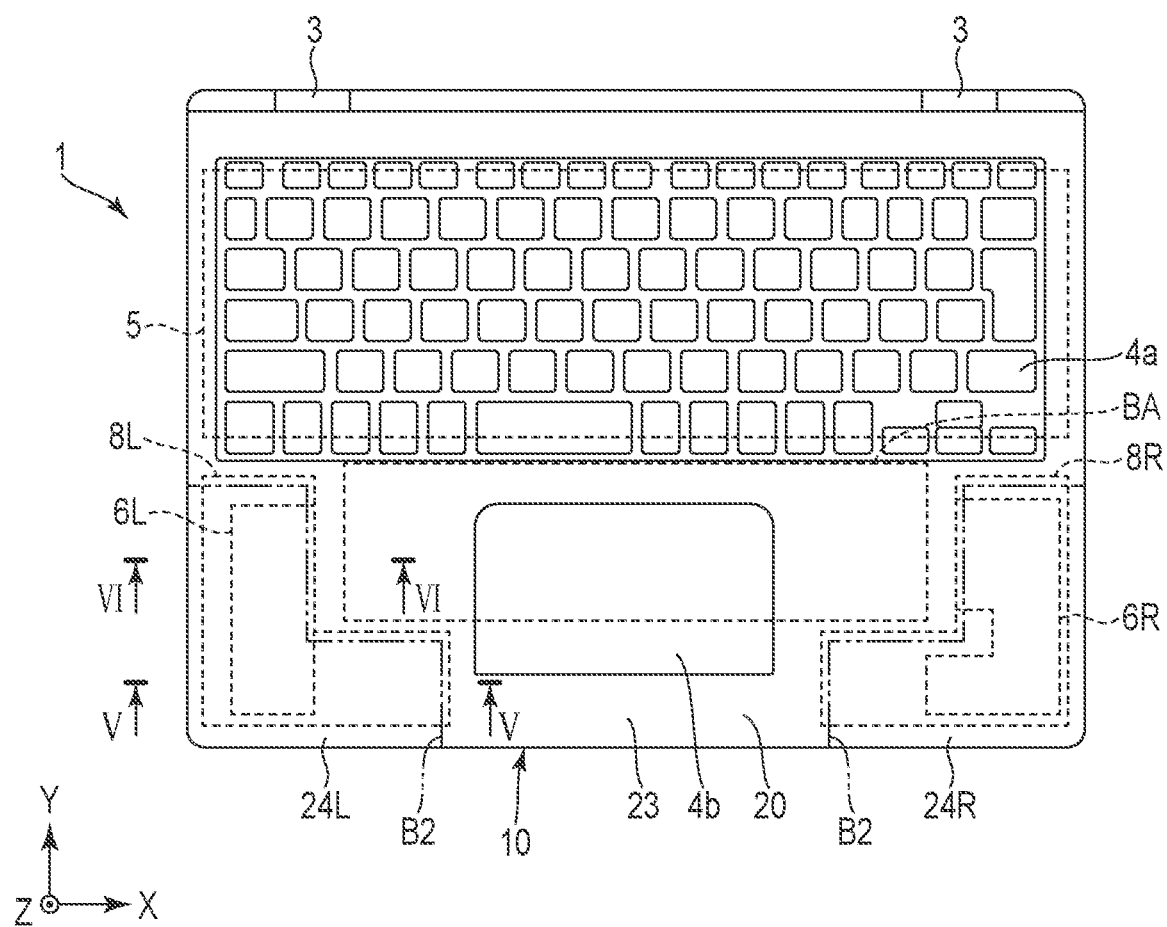
FIG. 3 is a plan view schematically showing the housing shown in FIG. 2 in an assembled state.
Figure 4:
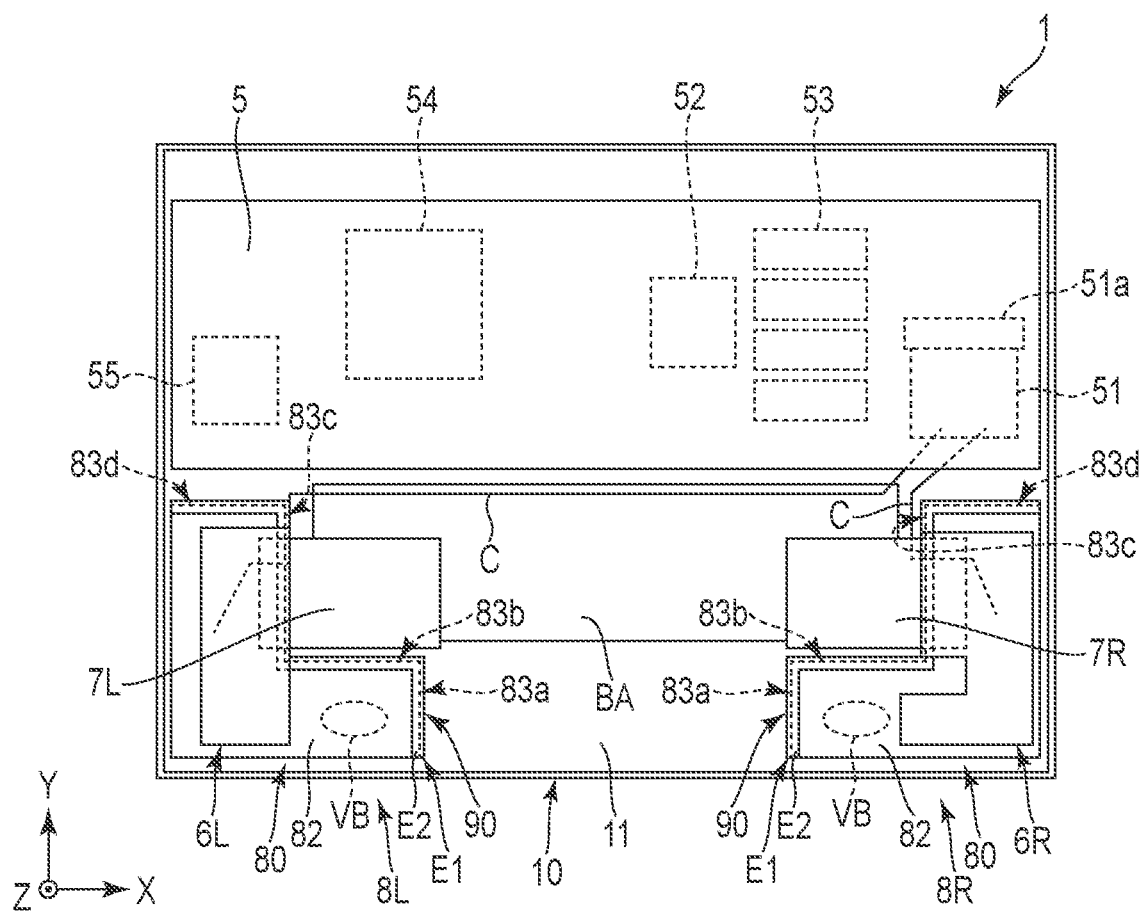
FIG. 4 is a plan view schematically showing an inside of the housing.

FIG. 2 is an exploded perspective view schematically showing the housing 1 provided on the electronic device 100 according to the embodiment. FIG. 3 is a plan view schematically showing the housing 1 shown in FIG. 2 in an assembled state. FIG. 4 is a plan view schematically showing an inside of the housing 1. In FIG. 2 and FIG. 3, the housing 2 is opened to the housing 1. In FIG. 3, illustration of the housing 2 is omitted. In FIG. 4, the inside of the housing 1 is viewed in a state in which the upper housing 20 is removed.

As shown in FIG. 2, the electronic device 100 comprises, in the housing 1, a circuit board 5 on which electronic components and the like are mounted, antennas 6L and 6R for transmission and reception, vibration generating members 8L and 8R, first elastic support members E1, second elastic support members E2, and a battery BA. In the following descriptions, the antennas 6L and 6R may be referred to as "antennas 6" as a whole, the in a mass as follows, the vibration generating members 8L and 8R may be referred to as "vibration generating members 8" as a whole, and the first elastic support members E1 and the second elastic support members E2 may be referred to as "elastic support members E" as a whole.

The lower housing 10 includes a bottom wall 11 and a peripheral wall 12 formed around the bottom wall 11. The peripheral wall 12 includes a front wall 12a, a back wall 12b, a side wall 12c located on a left side, and a side wall 12d located on a right side. The bottom wall 11 and the peripheral wall 12 include a first shield portion 13 formed of a conductor and first non-shield portions 14L and 14R formed of dielectric. The first non-shield portions 14L and 14R may be referred to as "first non-shield portions 14" as a whole in the following descriptions.

The first non-shield portion 14L is formed from a corner part formed by the front wall 12a and the side wall 12c along the first direction X and the second direction Y. The first non-shield portion 14R is formed from a corner part formed by the front wall 12a and the side wall 12d along the second direction Y and a direction opposite to the first direction X.

That is, the first non-shield portions 14L and 14R are formed near the corner parts formed by the front wall 12a and the side walls 12c and 12d of the lower housing 10, respectively. The first shield portion 13 is the part of the bottom wall 11 and the peripheral wall 12 except the parts where the first non-shield portions 14 are formed.

The upper housing 20 includes an upper wall 21 spaced apart from and opposed to the bottom wall 11, and a peripheral wall 22 formed around the upper wall 21. The peripheral wall 22 includes a front wall 22a, a back wall 22b, a side wall 22c located on the left side, and a side wall 22d located on the right side. The upper wall 21 and the peripheral wall 22 include a second shield portion 23 formed of a conductor and second non-shield portions 24L and 24R formed of a dielectric. The second non-shield portions 24L and 24R may be referred to as "second non-shield portions 24" as a whole in the following descriptions.

The second non-shield portion 24L is formed from a corner part formed by the front wall 22a and the side wall 22c along the first direction X and the second direction Y. The second non-shield portion 24R is formed from a corner part formed by the front wall 22a and the side wall 22d along the second direction Y and a direction opposite to the first direction X.

That is, the second non-shield portions 24L and 24R are formed near the corner parts formed by the front wall 22a and the side walls 22c and 22d of the upper housing 20, respectively. The second shield portion 23 is the part of the upper wall 21 and the peripheral wall 22 except the parts where the second non-shield portions 24 are formed. The first non-shield portions 14R and 24L, and the second non-shield portions 24L and 24R, are, for example, formed in the same shape and, in the embodiment, in an L-letter shape in planar view.

Boundaries between the first shield portion 13 and the first non-shield portions 14 of the lower housing 10 are referred to as boundaries B1, and boundaries between the second shield portion 23 and the second non-shield portions 24 of the upper housing 20 are referred to as boundaries B2. On the boundaries B1 and B2, various types of shapes can be applied to the first shield portion 13 and the first non-shield portions 14, and the second shield portion 23 and the second non-shield portions 24. The boundaries B1 and B2 schematically indicate the respective boundaries and may be different from the shapes at the time of the actual connection.

On the boundaries B1, the first shield portion 13 and the first non-shield portions 14 may be overlaid or may not be overlaid. Similarly, on the boundaries B2, the second shield portion 23 and the second non-shield portions 24 may be overlaid or may not be overlaid. In the example shown in FIG. 2, the boundaries B1 and the boundaries B2 are formed of parts extending in the second direction Y and parts extending in the first direction X. The boundaries B1 and B2 may include parts intersecting the first direction X and the second direction Y.

The conductors forming the first shield portion 13 and the second shield portion 23 are, for example, metallic materials such as a magnesium alloy and aluminum, but are not limited to metallic materials. The dielectric for formation of the first non-shield portions 14 and the second non-shield portions 24 is, for example, a resin material such as fluorine resin, polyethylene, polypropylene, polycarbonate, or polycarbonate-ABS, but the dielectric is not limited to the resin material.

From the other viewpoint, the lower housing 10 is composed of members forming the first shield portion 13 and members which form the first non-shield portions 14 and which are different from the members. The upper housing 20 is composed of members forming the second shield portion 23 and members which form the second non-shield portions 24 and which are different from the members.

Each of the lower housing 10 and the upper housing 20 is formed by, for example, insert molding or two color molding. In this case, the first shield portion 13 and the first non-shield portions 14 are formed integrally, and the second shield portion 23 and the second non-shield portions 24 are formed integrally.

In the third direction Z, the first shield portion 13 of the bottom wall 11 is opposed to the second shield portion 23 of the upper wall 21, and the first non-shield portions 14 of the bottom wall 11 are opposed to the second non-shield portions 24 of the upper wall 21. In planar view, the area of the first shield portion 13 is substantially the same as the area of the second shield portion 23, and the area of the first non-shield portions 14 is substantially the same as the area of the second non-shield portions 24.

Alternatively, the area of the first shield portion 13 may be larger or smaller than the area of the second shield portion 23. Similarly, the area of the first non-shield portions 14 may be larger or smaller than the area of the second non-shield portions 24.

A shield region SA includes the first shield portion 13, the second shield portion 23, and space between the first shield portion 13 and the second shield portion 23. In contrast, a non-shield region NSA includes the first non-shield portion 14L, the second non-shield portion 24L, and space between the first non-shield portion 14L and the second non-shield portion 24L. Furthermore, the non-shield region NSA includes the first non-shield portion 14R, the second non-shield portion 24R, and space between the first non-shield portion 14R and the second non-shield portion 24R.

Boundaries between the shield region SA and the non-shield regions NSA include, for example, the above boundaries B1, the above boundaries B2, ad space between the boundaries B1 and B2. As shown in FIG. 2 and FIG. 3, since the non-shield regions NSA are formed near corner portions on both sides located on the front side of the housing 1, the non-shield regions NSA are formed on an outer peripheral side of the housing 1 relative to the shield region SA in planar view.

The circuit board 5 and the battery BA are provided in the shield region SA, and the antennas 6 are provided in the non-shield regions NSA. More specifically, the circuit board 5 and the battery BA are arranged between the first shield portion 13 and the second shield portion 23. In addition, the antenna 6L is arranged between the first non-shield portion 14L and the second non-shield portion 24L, and the antenna 6R is arranged between the first non-shield portion 14R and the second non-shield portion 24R. Since the first non-shield portions 14 and the second non-shield portions 24 are formed of dielectrics, the antennas 6 in the non-shield regions NSA can execute radio wave transmission and reception with the outside of the housing 1.

The vibration generating members 8 are arranged in the housing 1 such that a part of a casing 80 to be described later is located in the shield region SA and other parts of the casing 80 are arranged in the non-shield regions NSA. From the other viewpoint, the vibration generating members 8 are overlaid on the boundaries B1 and B2 in the third direction Z. In the third direction Z, the antenna 6L is overlaid on the vibration generating member 8L, and the antenna 6R is overlaid on the vibration generating member 8R.

The elastic support members E are arranged in the shield region SA. More specifically, the first elastic support members E1 are arranged between the vibration generating member 8L and the bottom wall 11, and between the vibration generating member 8R and the bottom wall 11. The second elastic support members E2 are arranged between the vibration generating member 8L and the upper wall 21, and between the vibration generating member 8R and the upper wall 21.

The first elastic support members E1 extend along the boundaries B1, and the second elastic support members E2 extend along the boundaries B2. The first elastic support members E1 and the second elastic support members E2 include parts extending in the second direction Y and parts extending in the first direction X.

As shown in FIG. 4, an antenna communication module 51, CPU 52, a memory 53, a power circuit 54, and an audio circuit 55 are mounted on the circuit board 5. The circuit board 5 is, for example, a printed circuit board. The antenna communication module 51, the CPU 52, the memory 53, the power circuit 54, and the audio circuit 55 are examples of the electronic components.

The antenna communication module 51 receives an electric wave received with the antenna 6 and supplies to the antenna 6 an electric wave to be transmitted. The circuit board 5 and the antenna communication module 51 are electrically connected and mechanically fixed by connectors 51a. The connectors 51a are a pair of a receptacle side and a plug side and, for example, the circuit board 5 is provided with the receptacle side and the antenna communication module 51 is provided with the plug side. The CPU 52, the memory 53, the power circuit 54 and the like mounted on the circuit board 5 may be sources of the noise that is a factor to reduce the performance of the antennas 6. Alternatively, the source of the noise is not limited to the above-mentioned example, but may be various types of electronic components, and the like accommodated in the housing 1.

The antennas 6 are planar antennas and, for example, communication antennas for LTE. The antennas 6 are also applicable to the fifth generation mobile communication system (5G). For example, the antenna 6L is an antenna for reception, and the antenna 6R is an antenna for transmission. Each of the antennas 6L and 6R is electrically connected to the antenna communication module 51 by a cable C.

Ends of the cable C are arranged between the antennas 6L and 6R and the vibration generating members 8L and 8R, respectively. The cable C is, for example, a coaxial cable. In addition, an antenna ground 7L is overlaid on the antenna 6L, and an antenna ground 7R is overlaid on the antenna 6R.

Speakers are disclosed as examples of the vibration generating members 8. The vibration generating members 8 include casings 80 formed of a dielectric and vibrating bodies VB accommodated in the casings 80. The vibrating bodies VB are held in a state of being capable of vibrating in the casings 80. In the operation of the vibration generating members 8, each of the vibrating bodies VB and the casings 80 vibrates. Furthermore, conductive layers 90 are formed on parts of the outer surfaces of the casings 80 as shown in FIG. 2.

The casings 80 are formed in an L-letter shape in planar view. The dielectric of which the casings 80 are formed is, for example, a resin material or the like. The dielectric may be the same as or different from the dielectric for formation of the first non-shield portions 14 and the second non-shield portions 24. The vibrating bodies VB are sources of the sound and include diaphragms, yokes, magnets, coils, and the like. For example, since the yokes are formed of a metal material, the vibrating bodies VB include members formed of a conductive material.

The acoustic wave occurring in each vibrating body VB is made to propagate by a hollow spatial region SP (cf. FIG. 5 and FIG. 6) formed at a part where the vibrating body VB is not arranged inside the casing 80.

The voice is amplified by making the acoustic wave propagate by the hollow spatial region SP. As shown in FIG. 4, the vibrating bodies VB are not overlaid on the antennas 6L and 6R in planar view.

By forming the casings 80 in an L-letter shape, not only the vibrating bodies VB can be arranged at locations which are not overlaid on the antennas 6L and 6R, but also the spatial regions SP can be formed largely. In addition, the casings 80 of the vibration generating members 8 are larger than the antennas 6 in planar view. Since upper surfaces 82 of the casings 80 cover the whole antennas 6 from the lower side, deterioration of the performance of the antennas 6 caused by the casings 80 hardly occurs.

As shown in FIG. 2, the casings 80 have bottom surfaces 81 opposed to the bottom wall 11, upper surfaces 82 located on a side opposite to the bottom surfaces 81 an opposed to the upper wall 21, and side surfaces 83 connecting the bottom surfaces 81 with the upper surfaces 82. The side surfaces 83 have side surfaces 83a, 83b, 83c, and 83d located between the antennas 6 and the circuit board 5. The side surfaces 83a and 83c extend in the second direction Y and are arranged in the first direction X. The side surfaces 83b and 83d extend in the first direction X and are arranged in the second direction Y. From the other viewpoint, the side surfaces 83a, 83b, 83c, and 83d extend along the boundaries B1 and B2.

Furthermore, the conductive layers 90 are formed in the casings 80 so as to be located between the antennas 6 and the circuit board 5. The conductive layers 90 are formed on the bottom surface 81, the upper surface 82, and the side surfaces 83a, 83b, 83c, and 83d, respectively. The conductive layers 90 are formed by sticking conductive tapes such as aluminum tapes on the casings 80, forming films of a metal material at parts where the side surfaces 83 of the casings 80 are in contact with the side surfaces 83 of the bottom surface 81 and the upper surface 82 by sputtering, forming conductive layers at parts where the side surfaces 83 of the casings 80 are in contact with the side surfaces 83 of the bottom surface 81 and the upper surface 82 by laser direct structuring (LDS), or the like.

The battery BA has, for example, a flat and approximately rectangular parallelepiped shape. The battery BA is arranged in front of the circuit board 5 inside the housing 1. In addition, the battery BA is arranged between the antenna 6L (vibration generating member 8L) and the antenna 6R (vibration generating member 8R) in the first direction X.

The elastic support members E are elastically deformable and are configured to be conductive. The elastic support members E are, for example, conductive gaskets. The elastic support members E are formed of, for example, foams (sponge) in which a conductive material of a metal and the like is dispersed. Alternatively, the elastic support members E may have conductive tapes, cloth, and the like around foams or may be cloth such as nonwoven fabrics having a conductive property.

The elastic support members E may have a rectangular or circular cross-section. Alternatively, the elastic support members E may be, for example, members cut from a sheet to have a determined shape or may have a string shape or a sheet shape. Each of the elastic support members E may be formed of one member or may be formed by combining a plurality of members. The elastic support members E extend along the boundaries B1 and B2 so as to be overlaid on the conductive layers 90.

The elastic support members E are members having a desired resistance value when compressed to a predetermined thickness. For example, the elastic support members E can obtain a resistance value of 0.08 to 0.09Ω when compressed by approximately 30% in an initial state. Furthermore, as another example, the elastic support members E can obtain a resistance value of 0.04 to 0.05Ω when compressed by approximately 50% in an initial state.

The first elastic support members E1 may be the same as or different from the second elasticity support members E2 in each of shape, size, material, and the like. For example, the first elastic support member E1 has an end in contact with the front wall 12a and the other end in contact with the side wall 12c. In addition, the second elastic support member E2 has an end in contact with the front wall 22a and the other end in contact with the side wall 22c.

Figure 5:
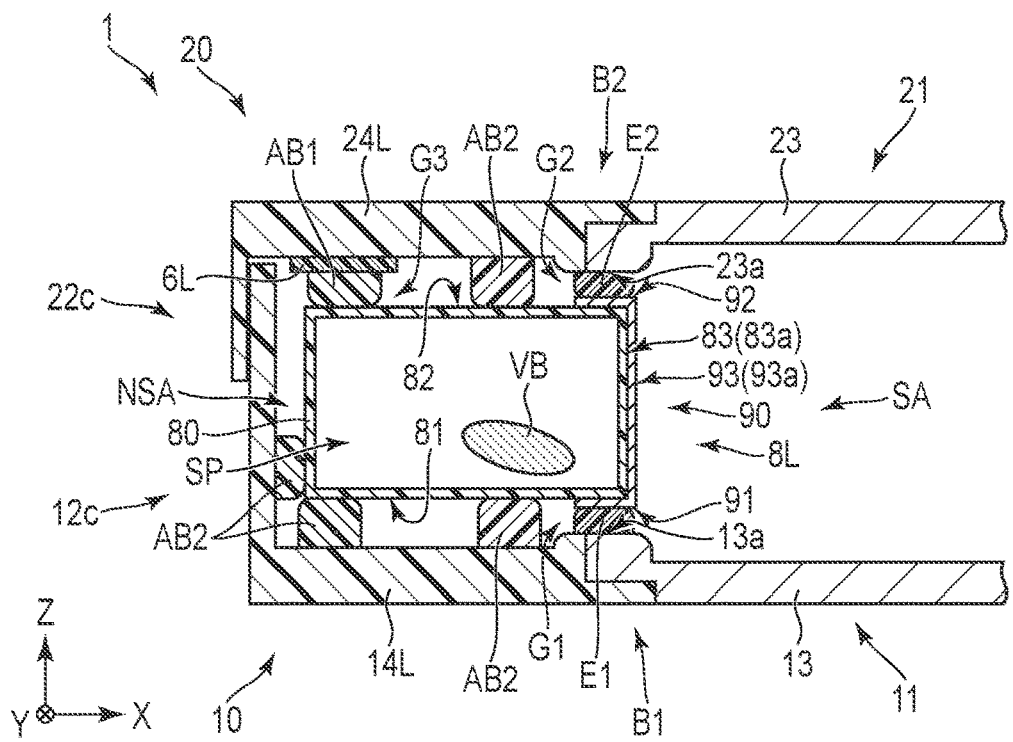
FIG. 5 is a partially sectional view schematically showing the electronic device shown in FIG. 3 as taken along line V-V.
Figure 6:
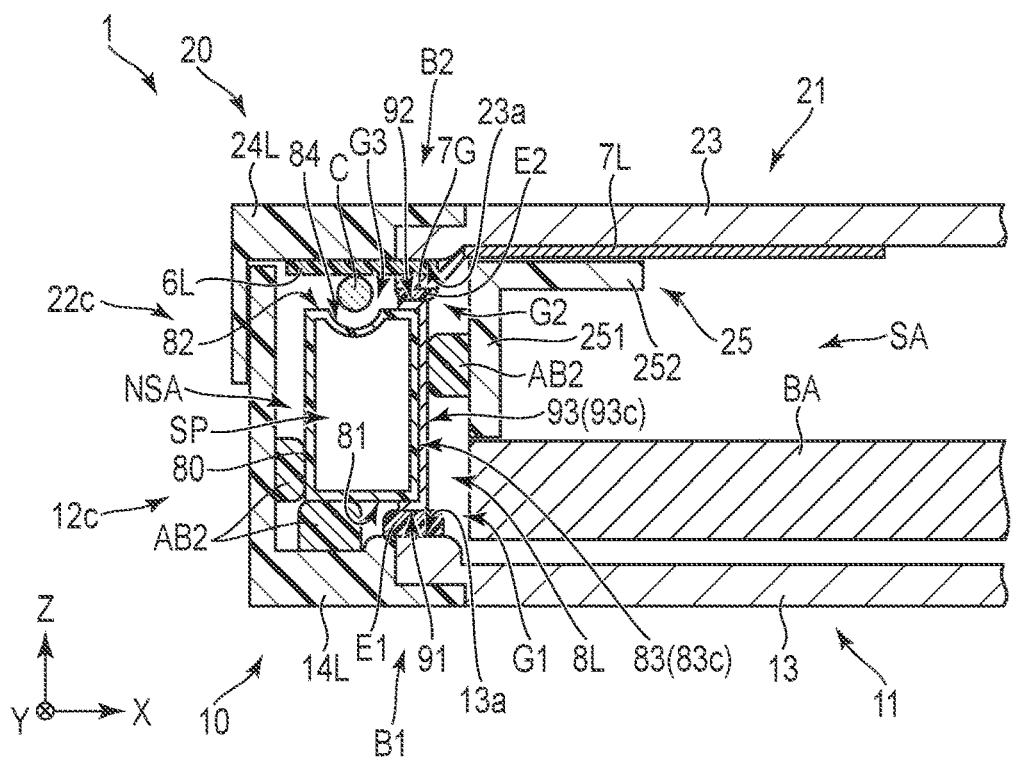
FIG. 6 is a partially sectional view schematically showing the electronic device shown in FIG. 3 as taken along line VI-VI.

FIG. 5 is a partially sectional view schematically showing the electronic device 100 shown in FIG. 3 as taken along line V-V. FIG. 6 is a partially sectional view schematically showing the electronic device 100 shown in FIG. 3 as taken along line VI-VI. FIG. 5 and FIG. 6 are cross-sectional views taken from the second direction Y. FIG. 6 is a cross-sectional view showing the part closer to the circuit board 5 than that in FIG. 5.

In FIG. 5 and FIG. 6, the left non-shield region NSA, the antenna 6L, and the vibration generating member 8L in the housing 1 will be mainly described, but the description can also be applied to the right non-shield region NSA, the antenna 6R, and the vibration generating member 8R.

In the example shown in FIG. 5 and FIG. 6, the first shield portion 13 and the first non-shield portion 14L are overlaid on each other on the boundary B1. At this time, the first shield portion 13 is located to be closer to the upper housing 20 side than the first non-shield portion 14L. In contrast, the second shield portion 23 and the second non-shield portion 24L are overlaid on each other on the boundary B2. At this time, the second shield portion 23 is located to be closer to the lower housing 10 side than the second non-shield portion 24L.

In the example shown in FIG. 5 and FIG. 6, the part where the first shield portion 13 and the first non-shield portion 14L are overlaid exists on the boundary B1, and the part where the second shield portion 23 and the second non-shield portion 24L are overlaid exists on the boundary B2.

The part where the first shield portion 13 and the first non-shield portion 14L are overlaid on the bottom wall 11 is formed to be thicker than the other parts of the bottom wall 11, and the part where the second shield portion 23 and the second non-shield portion 24L are overlaid on the upper wall 21 is formed to be thicker than the other parts of the upper wall 21.

At least a part of the first shield portion 13 is more exposed to the conductive layer 90 side than the first non-shield portion 14L, and at least a part of the second shield portion 23 is more exposed to the conductive layer 90 side than the second non-shield portion 24L. In the embodiment, the inner surface 13a and the inner surface 23a are exposed to the conductive layer 90.

From the other viewpoint, the first non-shield portion 14L is located on the outer peripheral side than the first shield portion 13, and the second non-shield portion 24L is located on the outer peripheral side than the second shield portion 23, on the boundaries B1 and B2. That is, parts formed on the outer peripheral side of the shield region SA are included in the non-shield regions NSA.

As shown in FIG. 5 and FIG. 6, the lower housing 10, the vibration generating member 8L, the antenna 6L, and the upper housing 20 are arranged in this order in the third direction Z. The vibration generating member 8L is arranged in the housing 1 such that a part of the casing 80 is located in the shield region SA while the other parts of the casing 80 are located in the non-shield region NSA.

From the other viewpoint, the bottom surface 81 of the casing 80 is opposed to the first shield portion 13 and the first non-shield portion 14L. The upper surface 82 of the casing 80 is opposed to the second shield portion 23 and the second non-shield portion 24L.

The side surfaces 83a, 83b, 83c, and 83d extend along the boundaries B1 and B2 as described above. The side surface 83a is shown in FIG. 5, and the side surface 83c is shown in FIG. 6. The conductive layer 90 includes a bottom conductive layer 91 formed to include the part of the bottom surface 81, which is located in the shield region SA, and opposed to the first shield portion 13, and an upper conductive layer 92 formed to include the part of the upper surface 82, which is located in the shield region SA, and opposed to the second shield portion 23.

Furthermore, the conductive layer 90 includes side conductive layers 93 formed on the side surfaces 83a, 83b, 83c, and 83d located in the shield region SA. The side conductive layers 93 electrically connect the bottom conductive layer 91 with the upper conductive layer 92. FIG. 5 shows a side conductive layer 93a formed on the side surface 83a, and FIG. 6 shows a side conductive layer 93c formed on the side surface 83c.

The bottom conductive layer 91 is formed at a part of the bottom surface 81, which is opposed to the first shield portion 13. The upper conductive layer 92 is formed at a part of the upper surface 82, which is opposed to the second shield portion 23. The bottom conductive layer 91 may be formed to the part opposed to the first non-shield portion 14L and the upper conductive layer 92 may be formed to the part opposed to the second non-shield portion 24L, but the upper conductive layer 92 should not be formed to the part of the antenna 6L, which is opposed to the element part 63 (cf. FIG. 7). The degradation of the performance of the antenna 6L caused by the upper conductive layer 92 can be inhibited by not forming the upper conductive layer 92 to the part.

A first clearance G1 is formed between the bottom conductive layer 91 and an inner surface 13a of the first shield portion 13, and a second clearance G2 is formed between the upper conductive layer 92 and an inner surface 23a of the second shield portion 23. From the other viewpoint, the casing 80 is arranged in the housing 1 such that the bottom conductive layer 91 places the first clearance G1 together with the inner surface 13a of the first shield portion 13 and that the upper conductive layer 92 places the second clearance G2 together with the inner surface 23a of the second shield portion 23.

Furthermore, the first elastic support member E1 is arranged in the first clearance G1, and the second elastic support member E2 is arranged in the second clearance G2. For example, the first elastic support member E1 and the second elastic support member E2 are stuck to the housing 1 or the like by a double-faced tape or the like having a conductive property.

The first clearance G1 and the second clearance G2 are set to the above-mentioned predetermined thickness when the first elastic support member E1 and the second elastic support member E2 are arranged. At this time, the first elastic support member E1 and the second elastic support member E2 can obtain the above-mentioned desired resistance value.

In the third direction Z, the size of the first clearance G1 is smaller than the thickness of the first elastic support member E1, and the size of the second clearance G2 is smaller than the thickness of the second elastic support member E2. Alternatively, the size of the first clearance G1 may be larger or smaller than or equal to the size of the second clearance G2.

In the shield region SA, the first elastic support member E1 in a compressed state is sandwiched between the bottom conductive layer 91 and the first shield portion 13, and the second elastic support member E2 in a compressed state is sandwiched between the upper conductive layer 92 and the second shield portion 23. In this case, the first elastic support member E1 is in contact with the bottom conductive layer 91 and the inner surface 13a of the first shield portion 13, and the second elastic support member E2 is in contact with the upper conductive layer 92 and the inner surface 23a of the second shield portion 23.

For example, the first elastic support members E1 is in contact so as to cover the whole or most part of the bottom conductive layer 91, in the state of being arranged in the first clearance G1, and the second elastic support member E2 is in contact so as to cover the whole or most part of the upper conductive layer 92, in a state of being arranged in the second clearance G2.

Since the elastic support member E has a conductive property and each of the inner surfaces 13a and 23a is a conductor, the first elastic support member E1 electrically connects the bottom conductive layer 91 with the inner surface 13a of the first shield portion 13, and the second elastic support member E2 electrically connects the upper conductive layer 92 with the inner surface 23a of the second shield portion 23, in the above-mentioned state. In addition, the side conductive layers 93 electrically connect the bottom conductive layer 91 with the upper conductive layer 92. For this reason, the first shield portion 13, the second shield portion 23, the bottom conductive layer 91, the upper conductive layer 92, and the side conductive layers 93 are connected electrically.

Since a shield structure is formed by the first shield portion 13, the second shield portion 23, the bottom conductive layer 91, the upper conductive layer 92, and the side conductive layers 93, the antenna 6L arranged in the non-shield region NSA can be shielded from the noise of the shield region SA.

Since the elastic support members E are sandwiched in a compressed state, the elastic support members E easily contact the bottom conductive layer 91, the upper conductive layer 92, and the inner surfaces 13a and 23a. Furthermore, since the elastic support members E are elastically deformable, the elastic support members E elastically support the casing 80 to the housing 1.

The antenna 6L is arranged between the second non-shield portion 24L of the upper wall 21 and the upper surface 82 of the casing 80, in the non-shield region NSA. As shown in FIG. 5 and FIG. 6, the antenna 6L is arranged more closely to the sides of the side walls 12c and 22c than the conductive layer 90 and the elastic support members E in the first direction X.

As shown in FIG. 6, the antenna ground 7L is stacked on a part of the lower surface of the antenna 6L. That is, the antenna ground 7L is arranged between the antenna 6L and the upper surface 82 of the casing 80. The antenna 6L is stuck to the second non-shield portion 24L by an adhesive member such as a double-faced tape. The antenna ground 7L is stuck to a ground portion 64 of an antenna pattern 62 to be described later, of the antenna 6L, by an adhesive member such as a conductive double-faced tape.

In addition, the antenna 6L is arranged at a location remote from the vibrating body VB. In the example shown in FIG. 5 and FIG. 6, the antenna 6L is arranged to be opposed to the outer surface of the casing 80 which forms the spatial region SP of the casing 80. From the other viewpoint, the antenna 6L is not overlaid on the vibrating body VB but is overlaid on the spatial region SP, in the stacking direction of the antenna 6L and the casing 80 (third direction Z).

The vibrating body VB is desirably accommodated in the casing 80 so as to be spaced from the antenna 6L in a distance of 5 mm or more. In addition, the upper conductive layer 92 is also desirably arranged on the upper surface 82 of the casing 80 so as to be spaced from the antenna 6L in a distance of 5 mm or more. All the other conductors except the antenna ground 7L are similarly arranged in the non-shield region NSA. The antenna 6L is arranged in the non-shield region NSA in a state of being spaced from the vibrating body VB, the upper conductive layer 92 or the other conductors in a linear distance of 5 mm or more. The degradation of the performance of the antenna 6L caused by the conductors can be inhibited by separating the antenna 6L from the conductors.

Figure 9:
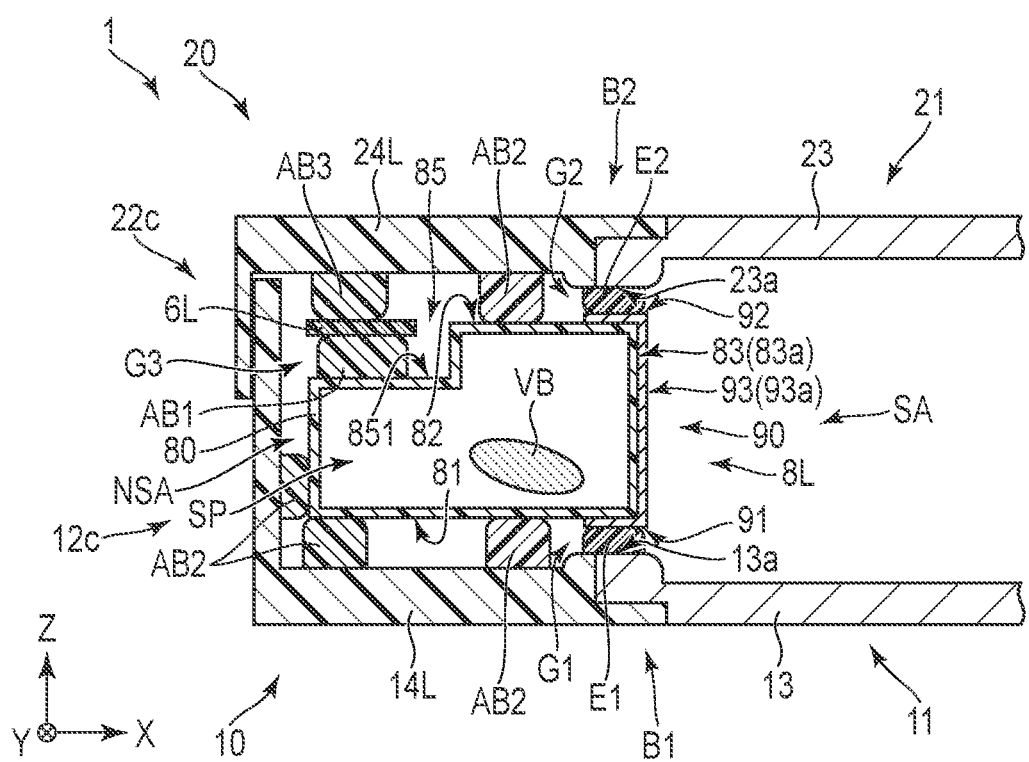
FIG. 9 is a diagram showing another example of a casing of a vibration generating member.

Furthermore, a third clearance G3 is formed between the antenna 6L and the upper surface 82. As shown in FIG. 5, a vibration absorbing member AB1 is arranged in a part of the third clearance G3. By arranging the vibration absorbing member AB1 in the third clearance G3, the casing 80 can be elastically held together with a vibration absorbing member AB2 to be described later, the lower housing 10, and the upper housing 20 even in a state in which the antenna 6L is overlaid on the upper surface 82 of the casing 80. As shown in FIG. 9, a vibration absorbing member may be further arranged between the antenna 6L and the second non-shield portion 24L.

As shown in FIG. 6, an inner wall 25 is arranged between the battery BA and the second shield portion 23 in the shield region SA. The inner wall 25 includes a part 251 extending in the third direction Z and a second part 252 extending in the first direction X. The inner wall 25 is stuck to the antenna ground 7L by, for example, an adhesive member such as a double-faced tape. The inner wall 25 is formed of, for example, a dielectric such as a resin material. On the inner wall 25, the first part 251 is not in contact with the battery BA. The inner wall 25 holds the battery BA at the time of production and inhibits deformation of the housing 1 when an external force is applied to the housing 1.

Furthermore, as shown in FIG. 5 and FIG. 6, the other vibration absorbing member AB2 is arranged between the casing 80 and the bottom wall 11, between the casing 80 and the upper wall 21, between the casing 80 and the side wall 12c, and between the first part 251 of the inner wall 25 and the side conductive layer 93c. The location of the casing 80 in the shield region SA and the non-shield region NSA is determined by arranging the vibration absorbing members AB1 and AB2 as well as the elastic support members E.

The vibration absorbing members AB1 and AB2 are foamed bodies (sponge) formed of, for example, a resin material. The vibration absorbing members AB1 and AB2 are arranged in the housing 1 in a deformable state. The vibration absorbing members AB1 and AB2 are stuck to the housing 1, the casing 80 and the like by, for example, an adhesive member such as a double-faced tape. The shape, size, material, and the like of each of the vibration absorbing members AB1 and AB2 can be appropriately selected in accordance with the arranged clearance and the like. The location and the number of the vibration absorbing members AB1 and AB2 are not limited to the example illustrated, but may be more or less than those of the embodiment.

The casing 80 of the vibration generating member 8L is arranged in the housing 1 in a state of being capable of vibrating by the elastic support members E and the vibration absorbing members AB1 and AB2. Since the elastic support members E and the vibration absorbing members AB1 and AB have a vibration proof function, the vibration of the vibrating body VB and the casing 80 is hardly transmitted to the lower housing 10 and the upper housing 20 at the time of operation of the vibration generating members 8.

As shown in FIG. 6, a cable C is provided between the antenna 6L and the upper surface 82. The cable C is arranged in, for example, a groove 84 formed in a part of the upper surface 82. Even when the cable C is arranged between the antenna 6L and the upper surface 82, the distance between the upper surface 82 and the second non-shield portion 24L can be made shorter in the third direction Z by forming the groove 84.

Figure 7:
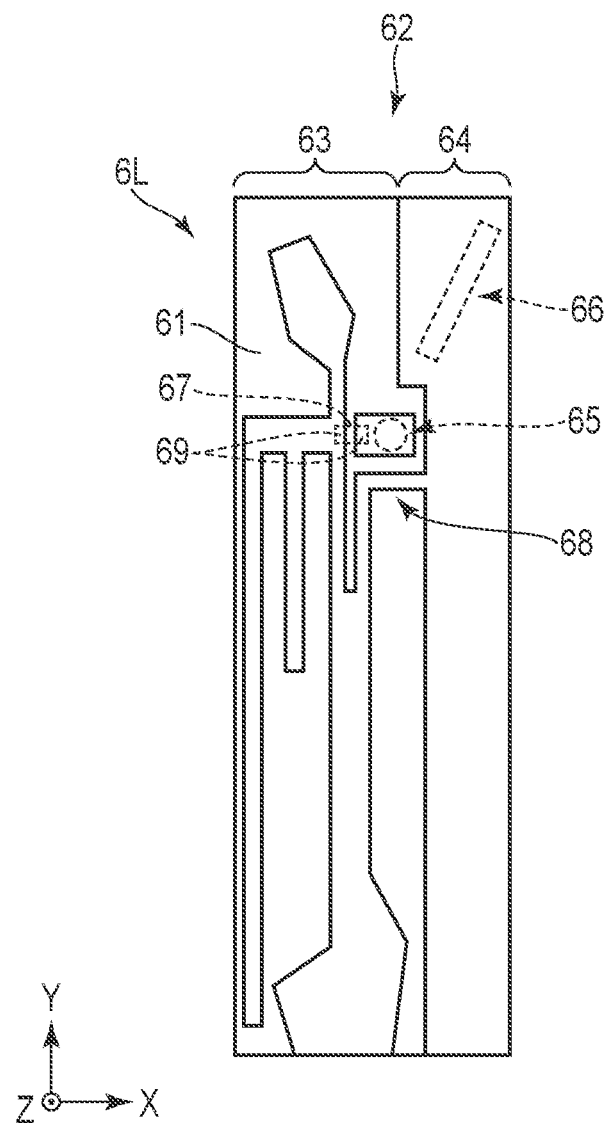
FIG. 7 is a plan view schematically showing an antenna.

The antenna 6L will be described here. FIG. 7 is a plan view schematically showing the antenna 6L. The antenna 6L includes an antenna substrate 61 in a rectangular shape and an antenna pattern 62 formed on the antenna substrate 61. The antenna substrate 61 is, for example, a flexible printed circuit board or the like.

The antenna pattern 62 includes an element portion 63, a ground portion 64, a connecting portion 65 serving as a feeding point, a connecting portion 66 formed in the ground portion 64, and a connecting portion 69 for an AC coupling capacitor 67 arranged between the connecting portion 65 and the element portion 63. The element portion 63 of the antenna pattern 62 is formed of a metal having a conductive property such as copper or aluminum or the like, on a surface of the antenna substrate 61 which is opposed to the lower surface of the upper housing 20.

Each of the element portion 63 and the ground portion 64 is electrically connected to the antenna communication module 51 shown in FIG. 4 by the cable C. The electrical connection is made by, for example, means such as soldering. The connecting portion 65 formed in the element portion 63 is connected to, for example, an inner conductor of the cable C. In contrast, the connecting portion 66 formed in the ground portion 64 is connected to, for example, an outer conductor of the cable C. As shown in FIG. 7, in the connecting portion 66, the ground portion 64 and the outer conductor of the cable C may be connected within a range of a certain length. The element portion 63 and the connecting portion 65 may be connected directly by a pattern of the substrate or improvement of the power efficiency may be attempted by providing an AC coupling capacitor 67 therebetween and cutting off a DC component of the current. In addition, charges supplied to the element portion 63 by the connecting portion 65 return to the connecting portion 66 via an electrical circuit 68 and the ground portion 64.

As shown in FIG. 6, a part of the antenna ground 7L is located between the upper conductive layer 92 and the second shield portion 23. The second elastic support member E2 is in contact with the upper conductive layer 92 and a ground 7G which is provided at the antenna gland 7L and whose conductor is exposed to the upper conductive layer 92. The upper conductive layer 92 is electrically connected to the second shield portion 23 through the ground 7G with which the second elastic support member E2 is in contact. In FIG. 6, the second elastic support member E2 is stuck to the antenna gland 7L.

Figure 8:
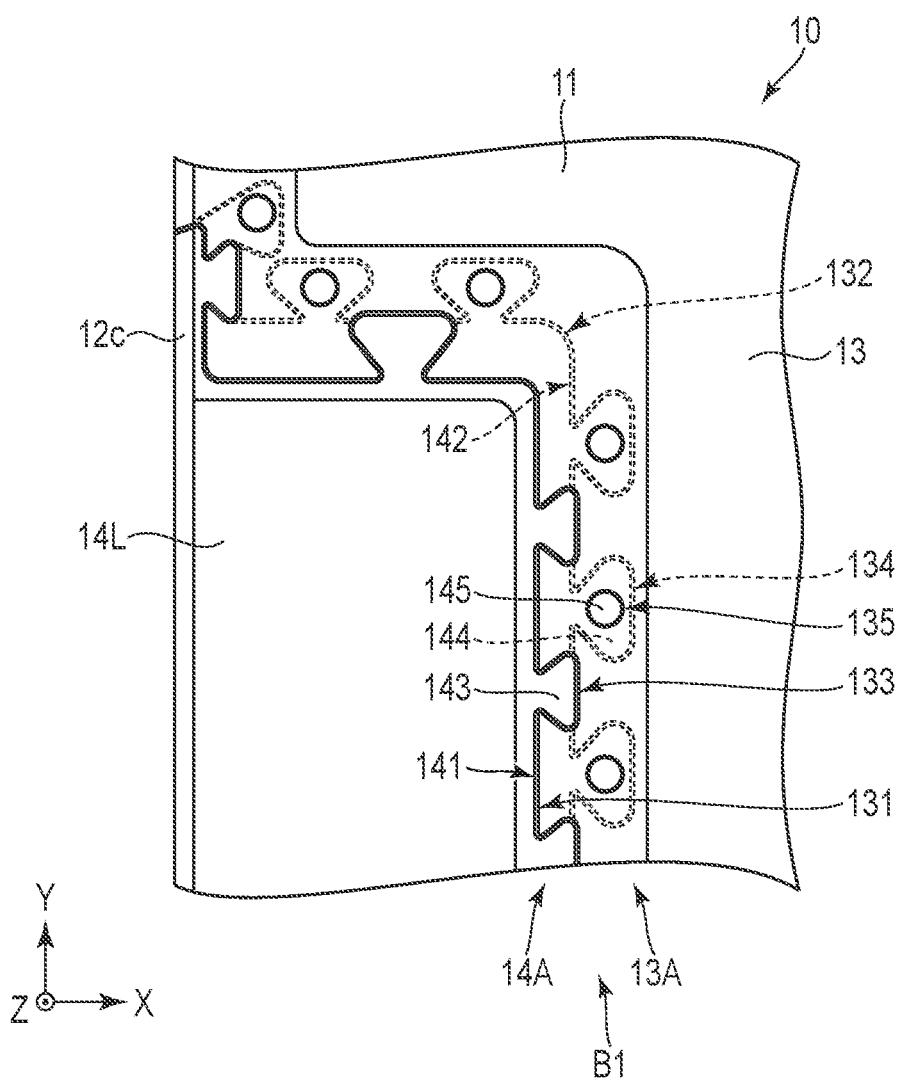
FIG. 8 is a partially plan view schematically showing an example of connection of a first shield portion and a first non-shield portion.

Next, an example of the coupling on the boundary B1 between the first shield portion 13 and the first non-shield portion 14L in the lower housing 10 will be described. FIG. 8 is a partially plan view schematically showing an example of the coupling between the first shield portion 13 and the first non-shield portion 14L. A part of this portion is enlarged in FIG. 8. The lower housing 10 will be exemplified here, but the coupling is also applicable to coupling parts of the second shield portion 23 and the second non-shield portion 24 in the second housing 20. The coupling parts of the lower housing 10 and the upper housing 20 may have similar shapes or different shapes.

A coupling part 13A is formed at the first shield portion 13, and a coupling part 14A is formed at the first non-shield portion 14L. The coupling part 14A has a surface 141 and a surface 142 located more closely to the first shield portion 13 side than the surface 141. The surface 142 is located at a lower position than the surface 141 in the third direction Z. Furthermore, the surface 141 includes protruding portions 143 which protrude to the first shield portion 13, and the surface 142 includes protruding portions 144 which protrude to the first shield portion 13. Moreover, the protruding portions 144 include pins 145 which protrude in the third direction Z (upward).

The coupling part 13A has a surface 131 opposed to the surface 141 and a surface 132 opposed to the surface 142, when coupled with the coupling part 14A. The surface 131 is located more closely to the first non-shield portion 14L side than the surface 132. In addition, the surface 132 is located at a lower positions than the surface 131 in the third direction Z. Furthermore, the surface 131 has recess portions 133 at positions corresponding to the protruding portions 143, and the surface 132 has recess portions 134 at positions corresponding to the protruding portions 144. Moreover, the coupling part 13A includes openings 135 at positions corresponding to the pins 145 when coupled with the coupling part 14A.

The first shield portion 13 and the first non-shield portion 14L can be formed integrally by forming the first non-shield portion 14L of a dielectric by insert molding, two color molding or the like for the conductor forming the first shield portion 13 including the above-described coupling part 13A.

When the coupling part 13A is coupled with the coupling part 14A, the protruding portions 143 are fitted in the recess portions 133, and engages in concavity 133, and the protruding portions 144 are fitted in the recess portions 134. Furthermore, the pins 145 are inserted into the openings 135. On the boundary B1, at least a part of the first shield portion 13 is further exposed to the bottom conductive layer 91 side than the first non-shield portion 14L.

Since the recess portions 133 and 134 are longer in the direction along the boundary B1 at positions farther from the first non-shield portion 14L, the protruding portions 143 are hardly detached from the recess portions 133, and the protruding portions 144 are hardly detached from the recess portions 134. Furthermore, since the pins 145 are inserted into the openings 135, the coupling part 13A is hardly detached from the coupling part 14A along the first direction X.

FIG. 9 is a diagram showing another example of the casing 80 of the vibration generating member 8. FIG. 9 is a partially sectional view schematically showing the electronic device 100 shown in FIG. 3 as taken along line V-V, similarly to FIG. 5. In FIG. 9, the vibration generating member 8L will be described, but descriptions are also applicable to the vibration generating member 8R.

The casing 80 includes a recess portion 85 which is recessed to the bottom surface 81 side, on the upper surface 82. The recess portion 85 is formed on the side of the side walls 12c and 22c of the upper surface 82, along the second direction Y. The recess portion 85 has a surface 851 parallel to the upper surface 82. In planar view, the surface 851 is formed to be larger than the antenna 6L. In addition, the recess portion 85 is larger than, for example, the thickness of the antenna 6L, in the third direction Z. The shape of the recess portion 85 is not limited to the example shown in FIG. 9.

As shown in FIG. 9, the antenna 6L is arranged in the recess portion 85. Similarly to FIG. 5, the vibrating body VB is not located under the antenna 6L. The vibration absorbing member AB1 is arranged in the third clearance G3. A vibration absorbing member AB3 is further arranged between the antenna 6L and the second non-shield portion 24L of the upper wall 21. A regular interval can be provided between the antenna 6L and the second non-shield portion 24L by arranging the vibration absorbing member AB3. The vibration absorbing member AB3 may be the same as or different from the above-described vibration absorbing members AB1 and AB2.

In addition, the vibration absorbing member AB3 may also be arranged between the antenna 6L and the second non-shield portion 24L, in the example shown in FIG. 5. A distance between the upper surface 82 and the second non-shield portion 24L can be made shorter and the housing 1 can be slimmed by arranging the antenna 6L in the recess portion 85 of the casing 80.

According to the above-described embodiment, the electronic device 100 capable of inhibiting an influence of the noise and securing the performance of the antenna can be provided. That is, in the housing 1, the shield wall can be formed by electrically connecting the conductive layer 90 formed in the casing 80 of the vibration generating members 8 to the first shield portion 13 and the second shield portion 23 by the elastic support members E. The degradation of performance of the antenna 6 is inhibited and the communication environment desirable for the antenna 6 is provided by shielding the antenna 6 arranged in the non-shield region NSA from the noise which occurs in the shield region SA by the formed shield wall.

Space necessary for the antenna 6 can be secured without increasing the thickness of the housing 1, by arranging the antenna 6 above the casing 80 formed of a dielectric, in the non-shield regions NSA, and the housing 1 can be thereby slimmed.

Furthermore, the elastic support members E have a conductive property, and comprise functions of not only electrically connecting the conductive layer 90 to the first shield portion 13 and the second shield portion 23, but also preventing the vibration of the casing 80. For this reason, even when the conductive layer 90 is formed in the casing 80 which accommodates the vibrating body VB vibrating at the operation similarly to a speaker, the vibration of the casing 80 is hardly transmitted to the housing 1 by arranging the elastic support members E between the casing 80 and the housing 1. In addition, the clearances G1 and G2 between the housing 1 and the vibration generating members 8 where the elastic support members E are arranged can be made small, and the housing 1 can be thereby slimmed.

According to the embodiment, since a dedicated shield wall does not need to be newly provided between the circuit board 5 which may be the source of the noise and the antennas 6L and 6R, the dedicated shield wall and necessary space such as the clearance can be saved, and wide space for accommodating the antennas and the vibration generating members 8 such as the speaker can be secured.

In addition, the weight of the whole electronic device 100 can be reduced by downsizing the housing 1, and user's convenience can be thereby improved. Since a dedicated shield wall does not need to be provided, the structure of the housing 1 can be simplified, and the manufacturing costs of the housing 1 can be thereby reduced. Furthermore, the elastic support members E of the embodiment can easily be installed to the housing 1 at the production.

As the other example of the housing 1 according to the embodiment, each of the lower housing 10 and the upper housing 20 may be formed of a dielectric, and the conductive layer may be formed by coating, plating, or the like on the inner surfaces of the parts corresponding to the first shield portion 13 and the second shield portion 23.

Alternatively, the first shield portion 13 and the second shield portion 23 may be formed to include a layer formed of a conductor on the inside and outer surface thereof, and a layer formed of a dielectric on the other parts thereof. In such a case, too, at least a part of the conductor is exposed to the conductive layers 90, at the first shield portion 13 and the second shield portion 23. For this reason, the shield wall can be formed by making the conductor electrically connected to the conductive layer 90 by the elastic support members E, and the antenna 6 arranged in the on-shield region NSA can be shielded from the noise occurring in the shield region SA.

In the embodiment, the non-shield region NSA is formed around the corner portions of both sides located on the front side of the housing 1, respectively, but the non-shield region NSA may be formed on the whole front side of the housing 1.

In FIG. 5, the example that the antenna 6L is stuck to the second non-shield portion 24L has been described, but a spacer may be further provided between the antennas 6L and 6R and the upper wall 21, and the antennas 6L and 6R may be stuck to the upper wall 21 through the spacer. A regular interval can be provided between the antenna 6 and the upper wall 21 by providing the spacer.

Incidentally, in the embodiment, a notebook PC has been described as an example of the electronic device 100, but the embodiment is also applicable to a mobile PC, the other information processing terminal, and the like. The communication antenna for LTE has been descried as the antennas 6L and 6R, but the antennas are also applicable to communication antennas for wireless LAN and the other radio communication antennas.

The speaker has been described as an example of the vibration generating member 8, but the vibration generating member 8 may be a fan accommodated in the housing 1 or the like. The conductive gasket has been described as an example of the elastic support members E, but the elastic support member E may be a coil spring formed of a metal material or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a housing including a shield region, and a non-shield region formed of a dielectric and not shielded, at least a part of the shield region is formed of a conductor, and the non-shield region located on an outer peripheral side than the at least part of the shield region;
a circuit board which is arranged in the shield region in the housing and on which electronic components are mounted;
an antenna which is arranged in the non-shield region in the housing;
a vibration generating member including a casing formed of a dielectric and a vibrating body provided in the casing, the vibration generating member being arranged in the housing such that a surface of a part of the casing is located in the shield region and another part of the casing is located in the non-shield region; and
an elastic support member which is sandwiched between the housing and the part of the casing in the shield region and elastically supports the casing, the elastic support member having a conductive property, wherein
a conductive layer is formed on a surface of the vibration generating member, the surface being located in the shield region,
the conductive layer contacts the elastic support member, and the conductive layer is electrically connected to the conductor by the elastic support member.

2. The electronic device of claim 1, wherein
the housing includes a lower housing including a bottom wall, and an upper housing including an upper wall spaced apart from the bottom wall and opposed to the bottom wall,
the bottom wall includes a first shield portion, and a first non-shield portion formed of the dielectric, at least an inner surface of the bottom wall being formed of the conductor,
the upper wall includes a second shield portion, and a second non-shield portion formed of the dielectric and opposed to the first non-shield portion, at least an inner surface of the upper wall being formed of the conductor and opposed to the first shield portion,
the casing includes a bottom surface, an upper surface, and a side surface, at least a part of the bottom surface being opposed to the first shield portion of the bottom wall, at least a part of the upper surface being opposed to the second shield portion of the upper wall, and the side surface extending along boundaries between the first shield portion and the second shield portion, and the first non-shield portion and the second non-shield portion,
the conductive layer includes a bottom conductive layer formed on the bottom surface and opposed to the first shield portion in a first clearance, an upper conductive layer formed on the upper surface and opposed to the second shield portion in a second clearance, and a side conductive layer formed on the side surface to electrically connect the bottom conductive layer with the upper conductive layer, and
the elastic support member includes a first elastic support member arranged in the first clearance and extending along the boundaries, and a second elastic support member arranged in the second clearance and extending along the boundaries.

3. The electronic device of claim 2, wherein
the elastic support member includes a conductive gasket composed of an elastically deformable material having a conductive property, and having a desired resistance value when compressed in a predetermined thickness, and
the first clearance and the second clearance are set to clearances in which the conductive gasket is arranged in a state of being compressed in the predetermined thickness.

4. The electronic device of claim 2, wherein
the antenna is arranged between the second non-shield portion of the upper wall and the upper surface of the casing, and a vibration absorbing member is arranged between the antenna and the upper wall.

5. The electronic device of claim 4, wherein
a third clearance is formed between the antenna and the upper surface of the casing, and
the vibration absorbing member is arranged in the third clearance.
6. The electronic device of claim 4, wherein
the casing includes a recess portion on the upper surface, the recess portion being recessed to the bottom surface side, and
the antenna is arranged in the recess portion.
7. The electronic device of claim 1, wherein
the casing includes the vibrating body containing a conductive material, and
the vibrating body is spaced apart from the antenna at an interval of 5 mm or more.
8. The electronic device of claim 7, wherein
the vibration generating member includes a speaker,
the casing includes a hollow spatial region in which an acoustic wave generated from the vibrating body propagates, and
the antenna is arranged to be opposed to an outer surface of the casing forming the spatial region.

\* \* \* \* \*